N. OVERAAS.
APPARATUS FOR DETERMINING THE ELEVATION AND DISTANCE OF AN AERIAL MARK FROM A BATTERY.
APPLICATION FILED SEPT. 28, 1918.

1,339,130.

Patented May 4, 1920.

UNITED STATES PATENT OFFICE.

NILS OVERAAS, OF TONSBERGFJORDENS, BEFAESTNINGER, NORWAY.

APPARATUS FOR DETERMINING THE ELEVATION AND DISTANCE OF AN AERIAL MARK FROM A BATTERY.

1,339,130.     Specification of Letters Patent.     Patented May 4, 1920.

Application filed September 28, 1918. Serial No. 256,094.

*To all whom it may concern:*

Be it known that I, NILS OVERAAS, a subject of the King of Norway, of Tonsbergfjordens, Befaestninger, Norway, have invented certain new and useful Improvements in Apparatus for Determining the Elevation and Distance of an Aerial Mark from a Battery; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an apparatus for determining quickly and with exactitude the distance from a battery to an aerial mark as an aeroplane or a zeppelin. For this purpose I use two or more observation stations (one of which is suitably placed at the battery, and the other or others at a suitable distance therefrom). The intersection of the sighting lines from these two stations indicates the point on the surface of the earth above which the aerial mark is sighted, this point being (as well known) the point of intersection of the horizontal projections of the two sighting lines or directions.

When I arrange my apparatus so as to enable the projections of the two sighting lines to be traced on a map (or a plate with divisions on a fixed scale) the horizontal distance of the aerial mark will be fixed and may be read off this map or plate.

Now according to my invention I also provide my sighting apparatus with a vertical plate, having divisions on the same scale as the horizontal map or plate, and on which the sighting line from the battery is likewise laid in; the direct distance from the battery to the aerial mark may then be read off, because this mark must always lie in the point of the sighting line lying vertically above the point of intersection in the horizontal map or plane.

Figure 1:
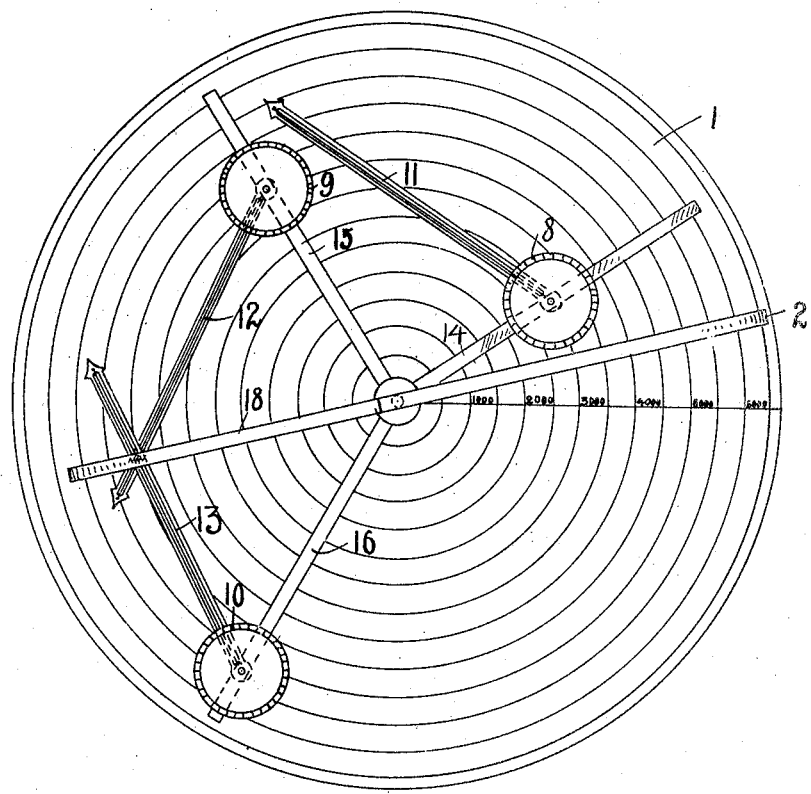

The battery apparatus is illustrated in the accompanying drawings,

Figure 1 being a diagrammatical plan view of the apparatus, and

Figure 2:
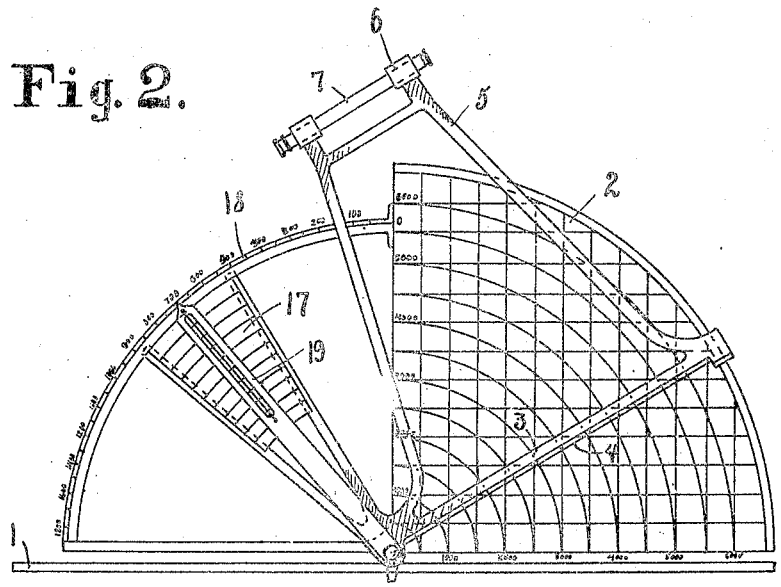

Fig. 2 a corresponding side view of the same.

The horizontal plate or disk 1 is provided with equidistant distance circles having the station of the apparatus on the map for center. If for instance the scale of the map is 1 to 25,000, the distance between the circles may suitably be 200 meters.

In the center of the circles of the said horizontal plate is placed a vertical pivot, on which a sleeve carrying the vertical plate 2 is mounted. The said vertical plate is provided with equidistant circles divided on the same scale as the horizontal plate, and is also provided with vertical lines corresponding to the respective equidistant circles of the horizontal plate. The vertical plate may eventually also be provided with horizontal lines with corresponding equidistance, but these are not strictly necessary. Turnable about a horizontal axis in the center of the vertical plate is placed an index 3, below which is fastened an index-thread 4, the prolongation of which passes through the center of the circle of the vertical plate. Through a frame 5 the index 3 is firmly connected to the sleeve 6 of the sighting telescope 7, said sleeve being parallel to the index, and consequently the optical axis of the telescope is parallel to the thread 4. The telescope must also be parallel to the vertical plate 2.

The apparatus is also provided with the necessary auxiliary mechanism (not shown) for the exact adjustment of the plate 1 in a horizontal plane, and for obtaining exact parallelism of the index thread or wire 4 and the telescope 7.

The apparatus of the sub station (not shown) comprises a telescope turnable about a vertical and a horizontal axis. About the vertical axis is placed a horizontal disk provided with a division or scale (for instance a point scale). Above this disk is placed an index provided with an index-thread, said index being firmly connected to the telescope and turning together with it so as to always preserve the thread of the index in the same vertical plane as the optical axis of the telescope.

In order to secure a reliable intersection it is preferable to use more than one sub station. The apparatus illustrated in the drawings is shown as coöperating with three sub stations. On the horizontal plate or disk (the map plate 1) there are placed three small disks 8, 9, 10, on the points of the map corresponding to the situation of the respective sub stations. These disks are provided with indexes 11, 12, 13, arranged to be put in positions exactly corresponding to that of the respective sub station.

These indexes may preferably be placed underneath their disks, which should preferably be made of celluloid or some other diaphanous material in order to enable the index threads to be seen through them. The disks 8, 9, 10 may be firmly attached to the map plate 1 or they may as shown in the drawings be displaceable along rails 14, 15, 16, which are turnable about the vertical sleeve, in order that sub stations may be arranged at will anywhere in the environs of the battery station.

The apparatus is worked in the following way:

The aerial mark (aeroplane, etc.) is sighted through the telescope of a sub station. The number of points of azimuth on the horizontal plate of the telescope (i. e., the position of its index) is read off and communicated to the battery or main station for instance by telephone. The attendant working the battery station apparatus then adjusts the index (11, 12 or 13) of the corresponding sub station accordingly.

Simultaneously the telescope 7 of the battery station is kept directed against the aerial mark. By following up the vertical line on the vertical plate 2 passing up from the point of intersection of this plate and the index of the sub station in question he finds the point of intersection between this line and the index thread 4, and is then in a position to read off direct the actual distance between the battery station and the aerial mark by means of the concentric circles of the vertical plate.

The speed of the aerial mark is determined by means of two successive sighting operations, the time interval of which is noted. The direction of the flight of the aerial mark is found by reading off the points of intersection on both plates (horizontal and vertical).

Instead of using telephone communications between the sub stations and the battery station and manual adjustment of the corresponding indexes, I may arrange electrically synchronous movement of the index of the sub station apparatus and the corresponding index of the battery station in well known manner. The reading off of the positions of the indexes on the stations and the corresponding disks 8 to 10 on the battery station is then dispensed with, and these disks may therefore in this case be omitted. It will be obvious that provided there is no practical obstacle to it, two battery stations may mutually serve as sub stations to each other.

In order to facilitate firing against aerial marks by aid of the sighting arrangement in question I may use the special arrangement shown in Fig. 2 consisting of a sector 17 firmly connected to the index 4 of the telescope, said sector being designated for semi-indirect firing—or indirect sighting. This device may be used advantageously when it is desired to place a barrier of fire in the path of the aerial mark.

The distance, speed and direction of the aerial mark being determined, a point in the path of the same is chosen to direct the firing against. In order to fix the elevation of the guns it is nceessary to know the elevation of the ground and the angle of elevation. The angle of elevation of the ground may be read off by subdividing one of the circles of the vertical plane, but in order to enable the reading off of the total of both angles there is attached to the vertical plate 2 a subdivided arc or scale 18. The zero of said arc or scale is situated vertically above the center of the circles. When the telescope is directed horizontally the zeros of the sector and the arc cover each other.

When the telescope is directed against the point against which fire is to be opened a mark at the zero point of the sector will indicate the ground angle. The elevation angle will vary according to the distance of the aerial mark as well as to its elevation, and the sector 17 therefore is provided with a plurality of arcs, each corresponding to a fixed elevation of the aerial mark. On the sector is placed an indicator 19 to be displaced by hand.

Assuming that the trajectories for the various elevations and distances are determined, each of the arcs or scales of the sector may be subdivided in such way that when the indicator 19 is placed on a determined divisional mark of the sector 17, the position of the indicator 19 relatively to the outer arc of the sector will indicate the angle of elevation, and relatively to the fixed arc 18 of the vertical plate will indicate the total of the angle of elevation and angle of ground (angle of the line of the object and the horizontal line), i. e., the elevation for which the guns are to be adjusted.

The disk of the sector should preferably be detachable, its subdivisions varying according to the type of guns in question.

Claims.

1. In apparatus for determining the elevation and distance of an aerial mark from a battery, a horizontal map plate or disk, a vertical plate or disk movable about a vertical axis on said horizontal plate, a sighting telescope movable in a vertical plane parallel to said vertical plate or disk, and indexes on said horizontal map plate corresponding to and capable of being set to the azimuth of the direction of sight at a distant sub-station.

2. In apparatus for determining the elevation and distance of an aerial mark from a battery, a horizontal map plate or disk having concentric sub-divisions thereon, a vertical plate or disk movable about the vertical axis of said horizontal plate and having vertical and circular graduations thereon corresponding to the aforesaid sub-divisions, a sighting telescope movable in a vertical plane parallel to said vertical plate or disk, indexes on said horizontal map plate arranged in correspondence to distant sub-stations and pivoted for movement in azimuth corresponding to the azimuth of the angle of sight at such sub-stations.

3. In apparatus for determining the elevation and distance of an aerial mark from a battery, a horizontal map plate or disk, a vertical plate or disk pivoted on a vertical axis on said horizontal plate, a sighting telescope pivoted to move in a vertical plane parallel to said vertical plate or disk, pivoted rails on said plate or disk, horizontal indexes pivoted on said rails in relation to said plate and in correspondence to distant sub-stations, said indexes displaceable along said pivoted rails on the horizontal plate.

4. In apparatus for determining the elevation and distance of an aerial mark from a battery, a horizontal map plate or disk, a vertical plate or disk turnable about with a vertical axis on said horizontal plate, a sighting telescope turnable in a vertical plane parallel to said vertical plate or disk, an index parallel to the optical axis of said telescope, a sector firmly connected to the index or telescope frame, and a curved scale on said vertical plate coöperating with said sector.

5. In apparatus for determining the elevation and distance of an aerial mark from a battery, a horizontal map plate or disk having concentric sub-division circles thereon, a vertical plate or disk turnable about a vertical axis on said horizontal plate and having a curved scale thereon, a sighting telescope turnable in a vertical plane parallel to said vertical plate or disk, an index parallel to the optical axis of said telescope, a sector firmly connected to the index or telescope frame, said curved scale coöperating with said sector, the zero of said scale being situated vertically above the center of the concentric subdivision circles of said horizontal plate.

6. In apparatus for determining the elevation and distance of an aerial mark from a battery, a horizontal map plate having concentric circular graduations thereon indicating distances, a radial arm pivoted at the center of said plate and graduations, a circular index positionable along said rail and having an indicating arm extending therefrom, a vertical plate pivoted to rotate on the center of said graduations and having circular and vertical graduations coinciding with those on the map plate, a sighting telescope pivoted to move in a plane parallel to the vertical plate and an index and wire connected to the telescope coöperating with graduations on said vertical plate.

7. In apparatus for determining the elevation and distance of an aerial mark from a battery, a horizontal concentrically graduated map plate, a vertical plate pivoted at the center of the map plate and its graduations, having vertical and concentric graduations corresponding to those on the map plate, a telescope and frame pivoted to move parallel to said vertical plate and having a sector graduated for ground elevations for particular types of guns and an indicator arm secured to said frame and movable by said frame, said indicator being manually adjusted with respect to said sector to correct for ground elevation.

In testimony that I claim the foregoing as my invention, I have signed my name in presence of two subscribing witnesses.

NILS OVERAAS.

Witnesses:
 WILT. FRUESEN,
 GEORGE B. SORENSEN.